United States Patent
Oyobe et al.

(10) Patent No.: US 8,054,013 B2
(45) Date of Patent: Nov. 8, 2011

(54) ELECTRIC POWER CONTROL DEVICE AND VEHICLE WITH THE SAME

(75) Inventors: Hichirosai Oyobe, Toyota (JP); Yoshinori Fujitake, Nishikamo-gun (JP); Toru Wakimoto, Chiryu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 388 days.

(21) Appl. No.: 12/312,438

(22) PCT Filed: Dec. 18, 2007

(86) PCT No.: PCT/JP2007/074777
§ 371 (c)(1),
(2), (4) Date: May 11, 2009

(87) PCT Pub. No.: WO2008/075780
PCT Pub. Date: Jun. 26, 2008

(65) Prior Publication Data
US 2010/0027305 A1    Feb. 4, 2010

(30) Foreign Application Priority Data
Dec. 19, 2006    (JP) ................................ 2006-341417

(51) Int. Cl.
*H02P 1/00*    (2006.01)
(52) U.S. Cl. ........ 318/139; 318/254; 318/149; 318/801; 180/65.4; 322/28; 322/99

(58) Field of Classification Search .................. 318/139, 318/245, 254, 149, 400.3, 801; 180/65.4, 180/65.29; 322/28, 99; 363/71, 165
See application file for complete search history.

(56) References Cited

U.S. PATENT DOCUMENTS

| | | | |
|---|---|---|---|
| 5,099,186 A | 3/1992 | Rippel et al. | |
| 7,265,455 B2 * | 9/2007 | Oyobe et al. | 290/1 R |
| 7,362,597 B2 * | 4/2008 | Ishikawa et al. | 363/71 |
| 7,486,035 B2 * | 2/2009 | Oyobe et al. | 318/149 |
| 7,561,389 B2 * | 7/2009 | Ishikawa et al. | 361/42 |
| 7,819,213 B2 * | 10/2010 | Oyobe et al. | 180/65.27 |
| 2006/0113798 A1 * | 6/2006 | Oyobe et al. | 290/7 |
| 2007/0171689 A1 * | 7/2007 | Ishikawa et al. | 363/71 |
| 2008/0073135 A1 * | 3/2008 | Oyobe et al. | 180/65.4 |

FOREIGN PATENT DOCUMENTS

| | | |
|---|---|---|
| JP | A-04-295202 | 10/1992 |
| JP | A-10-117445 | 5/1998 |
| JP | A-2005-237133 | 9/2005 |
| JP | A-2006-101632 | 4/2006 |

* cited by examiner

*Primary Examiner* — Paul Ip
(74) *Attorney, Agent, or Firm* — Oliff & Berridge, PLC

(57) ABSTRACT

Power lines are connected to neutral points of motor generators, respectively, and an electric power is transmitted and received between a vehicle and a load outside the vehicle via the power lines. In this transmission, an ECU simultaneously PWM-controls all phases of one of inverters, and controls the other inverter to keep continuously the conducting state.

14 Claims, 12 Drawing Sheets

ELECTRIC POWER CONTROL DEVICE AND VEHICLE WITH THE SAME

TECHNICAL FIELD

The present invention relates to an electric power control device and a vehicle with the same, and particularly relates to an electric power control device that can transmit and receive an electric power between a power storage device mounted on a vehicle and an electric load outside the vehicle or a power supply outside the vehicle as well as the vehicle provided with the same.

BACKGROUND ART

Japanese Patent Laying-Open No. 4-295202 has disclosed an electric motor drive and a power processing device that can transmit and receive an electric power between an alternating-current (AC) power supply outside a vehicle and a direct-current (DC) power supply on the vehicle. This device includes a DC power supply, two inverters undergoing pulse width modulation (which may also be referred to as "PWM" hereinafter), two induction motors, a control unit, an input/output port and an EMI filter. Each induction motor includes a Y-connected winding, and the input/output port is electrically connected to a neutral point of each winding.

When this device is in a recharge mode, a DC power supply can be charged with a DC power produced by converting an AC power that is applied to the neutral point of each winding from a single-phase power supply connected to the input/output port. Also, a regulated AC of a sinusoidal wave can be generated between neutral points of the windings and can be provided to an outer device connected to the input/output port.

The EMI filter is arranged between the neutral point of each winding and the input/output port, and reduces common mode noises of high frequencies appearing on the input/output port.

However, Japanese Patent Laying-Open No. 4-295202 employs the EMI filter for reducing the common mode noises that appear due to high-frequency switching of the inverters so that the device has large sizes.

DISCLOSURE OF THE INVENTION

Accordingly, an object of the invention is to provide an electric power control device that can transmit and receive an electric power between a power storage device mounted on a vehicle and an electric load outside a vehicle or a power supply outside a vehicle, suppresses common mode noises and suppresses increase in size of the device, and is also to provide a vehicle with the same.

According to the invention, an electric power control device is capable of transmitting and receiving an electric power between a power storage device mounted on a vehicle and an electric load outside the vehicle or a power supply outside the vehicle, and includes a plurality of AC electric rotating machines, a plurality of inverters, a plug, a power line pair and a control unit. Each of the AC electric rotating machines includes star-connected multi-phase windings as stator windings. The plurality of inverters are provided corresponding to the plurality of AC electric rotating machines. The plug is connectable to the electric load outside the vehicle or the power supply outside the vehicle. The power line pair is provided between the plug and neutral points of the multi-phase windings of the two AC electric rotating machines among the plurality of AC electric rotating machines. The control unit is configured to transmit and receive the electric power between the power storage device and the electric load or the power supply by controlling one of the inverters corresponding to the two AC electric rotating machines using a pulse width modulation method.

In this invention, the electric power is transmitted and received between the power storage device and the electric load outside the vehicle or the power supply outside the vehicle via the power line pair that is provided between the plug and the neutral points of the multi-phase windings of the two AC electric rotating machines among the plurality of AC electric rotating machines. Since the control unit controls one of the inverters corresponding to the two AC electric rotating machines, using the pulse width modulation method, an amount of variations in common mode voltage that occur due to high-frequency switching of the inverters can be reduced by half as compared with the case where both the inverters corresponding to the two AC electric rotating machines are controlled using the pulse width modulation method.

Accordingly, the invention can suppress common mode noises that may occur when the electric power is transmitted and received between the power storage device and the electric load outside the vehicle or the power supply outside the vehicle. Consequently, a noise reduction filter can be eliminated or reduced in size so that increase in size of the device can be suppressed.

Preferably, the electric power transmitted and received between the power storage device and the electric load outside the vehicle or the power supply outside the vehicle is an AC power having a frequency lower than a switching frequency of the inverter controlled using the pulse width modulation method. The control unit controls the other of the inverters corresponding to the two AC electric rotating machines to attain the conducting state by turning on one of upper and lower arms of the other inverter according to a supply direction of the AC power.

In this invention, one of the inverters is controlled using the pulse width modulation method, and the other inverter is controlled to attain the conducting state. Therefore, when the voltage of the AC power is inverted, the current in the other inverter does not become discontinuous, and the variation amount of the common mode voltage is suppressed. Accordingly, the invention can sufficiently suppress the common mode noises.

Further preferably, the control unit alternately switches between control using the pulse width modulation method and control of the conducting state for each of the inverters corresponding to the two AC electric rotating machines according to the supply direction of the AC power.

In this invention, since the inverter controlled using the pulse width modulation method and the inverter controlled to attain the conducting state are alternately switched according to the supply direction of the AC power, the variations in common mode voltage caused by the voltage inversion of the AC power are suppressed. Therefore, the invention can suppress further sufficiently the common mode noises.

Preferably, the control unit controls a first inverter corresponding to one of the two AC electric rotating machines using the pulse width modulation method, and alternately turns on upper and lower arms of a second inverter corresponding to the other of the two AC electric rotating machines according to the supply direction of the AC power.

In this invention, the inverter controlled using the pulse width modulation method and the inverter controlled to attain the conducting state are fixed. Therefore, this invention can simplify the control performed when the electric power is transmitted and received between the power storage device and the electric load outside the vehicle or the power supply outside the vehicle.

Preferably, when the power storage device is charged from the power supply outside the vehicle, the control unit controls a first inverter corresponding to one of the two AC electric rotating machines using the pulse width modulation method, and stops a second inverter corresponding to the other of the two AC electric rotating machines.

In this invention, one of the inverters is controlled using the pulse width modulation method, and the other converter is stopped or shut down. Therefore, this invention can further simplify the control performed when the electric power is transmitted and received between the power storage device and the electric load outside the vehicle or the power supply outside the vehicle.

Preferably, a stray capacitance between each of the two AC electric rotating machines and a vehicle ground is larger than a stray capacitance between each of other AC electric rotating machine(s) and the vehicle ground.

When the electric power is transmitted and received between the power storage device and the electric load outside the vehicle or the power supply outside the vehicle, this invention uses the two AC electric rotating machines having relatively large stray capacitances between the vehicle ground and the respective machines. This structure increases a quantity of a common mode current that returns to the vehicle ground via the stray capacitances. Thus, this structure suppresses a quantity of the common mode current provided to the electric load outside the vehicle or the power supply outside the vehicle. Therefore, this invention can sufficiently suppress the common mode noises.

Preferably, the electric power control device further includes a line bypass capacitor, and a shutdown device. The line bypass capacitor is provided between the power line pair and the vehicle ground. The shutdown device interrupts the electric circuit formed between the power line pair and the vehicle ground via the line bypass capacitor when the power storage device is charged from the power supply outside the vehicle.

This invention employs the line bypass capacitor, and therefore further reduces the variation amount of the common mode voltage when the electric power is supplied to the electric load outside the vehicle. When the power storage device is charged from the power supply outside the vehicle, a current may flow from the power supply to the vehicle ground via the line bypass capacitor having a low impedance with respect to the charge current, but the shutdown device interrupts the electric circuit formed between the power line pair and the vehicle ground via the line bypass capacitor. Therefore, this invention can sufficiently suppress the common mode noises when the electric power is supplied to the electric load outside the vehicle. When the power storage device is charged from the power supply outside the vehicle, this invention can prevent the charge current supplied from the power supply from flowing to the vehicle ground.

According to the invention, a vehicle includes a wheel receiving a drive torque from at least one of the plurality of AC electric rotating machines; and one of the foregoing electric power control devices. Therefore, this invention can suppress the common mode noises when the electric power is transmitted and received between the power storage device and the electric load outside the vehicle or the power supply outside the vehicle, without impeding reduction in size of the vehicle.

As described above, this invention can suppress the common mode noises when the electric power is transmitted and received between the power storage device and the electric load outside the vehicle or the power supply outside the vehicle. Consequently, the noise reduction filter can be eliminated or reduced in size so that increase in size of the device can be suppressed. Accordingly, the reduction in size of the vehicle is not impeded.

BEST MODES FOR CARRYING OUT THE INVENTION

Embodiments of the invention will now be described with reference to the drawings. In the following description, the same or corresponding portions bear the same reference numbers, and description thereof is not repeated.

First Embodiment

Figure 1:
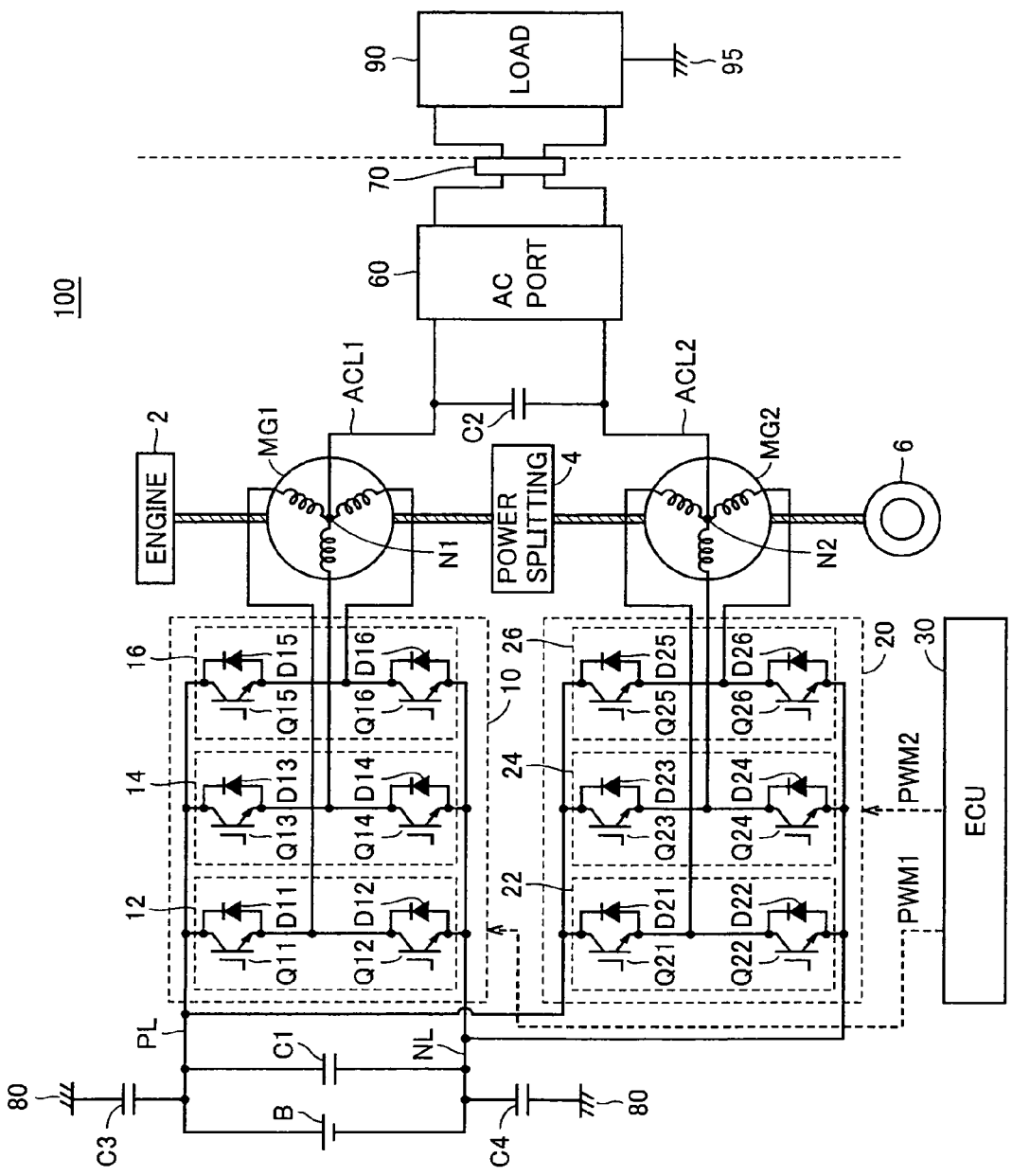
FIG. 1 is a whole block diagram of a hybrid vehicle shown as an example of a vehicle according to a first embodiment of the invention.

FIG. 1 is a whole block diagram of a hybrid vehicle shown as an example of a vehicle according to a first embodiment of the invention. Referring to FIG. 1, a hybrid vehicle 100 includes an engine 2, motor generators MG1 and MG2, a power splitting mechanism 4 and wheels 6. Hybrid vehicle 100 also includes a power storage device B, inverters 10 and 20, an electronic control unit (which will be referred to as an "ECU" hereinafter) 30, a smoothing capacitor C1, a positive line PL and a negative line NL. Hybrid vehicle 100 further includes power lines ACL1 and ACL2, a smoothing capacitor C2, an AC port 60 and a plug 70.

Power splitting mechanism 4 is coupled to engine 2 and motor generators MG1 and MG2, and distributes a power among them. For example, power splitting mechanism 4 may be formed of a planetary gear having three rotation shafts, i.e., a sun gear, a planetary gear and a ring gear. These three rotation shafts are connected to rotation shafts of engine 2 and motor generators MG1 and MG2, respectively. For example, motor generator MG1 has a hollow rotor through which a crank shaft of engine 2 coaxially extends so that engine 2 and motor generators MG1 and MG2 can be mechanically connected to power splitting mechanism 4.

Power splitting mechanism 4 distributes the power generated by engine 2 between wheels 6 and motor generator MG1. Thus, engine 2 is arranged in hybrid vehicle 100 as a power source for driving wheels 6 and for driving motor generator MG1. Motor generator MG1 is arranged in hybrid vehicle 100 as a component that operates as an electric generator driven by engine 2 and also operates as an electric motor that can crank engine 2. Motor generator MG2 is arranged in hybrid vehicle 100 as a power source for driving wheels 6.

As will be described later, when plug 70 is connected to a load 90 that generally indicates an electric load or a power supply outside the vehicle, hybrid vehicle 100 can transmit and receive the electric power between power storage device B and load 90.

A positive terminal of power storage device B is connected to positive line PL, and a negative terminal of power storage device B is connected to negative line NL. Smoothing capacitor C1 is connected between positive and negative lines PL and NL. Inverter 10 includes U- V- and W-phase arms 12, 14 and 16, which are connected in parallel between positive and negative lines PL and NL. U-phase arm 12 is formed of switching elements Q11 and Q12 connected in series. V-phase arm 14 is formed of switching elements Q13 and Q14 connected in series. W-phase arm 16 is formed of switching elements Q15 and Q16 connected in series. Diodes D11-D16 are connected in anti-parallel to switching elements Q11-Q16, respectively. Inverter 20 includes U-, V- and W-phase arms 22, 24 and 26. Inverter 20 has substantially the same structure as inverter 10.

The above switching element may be formed of, e.g., an IGBT (Insulated Gate Bipolar Transistor) or a power MOSFET (Metal Oxide Semiconductor Field-Effect Transistor).

Motor generator MG1 includes Y-connected three-phase coils, each of which has an end connected to ends of the other coils to form a neutral point N1. Motor generator MG2 likewise includes Y-connected three-phase coils, each of which has an end connected to ends of the other coils to form a neutral point N2. Neutral points N1 and N2 are connected to power lines ACL1 and ACL2, respectively. Power lines ACL1 and ACL2 are connected to AC port 60, and plug 70 is connected to AC port 60.

Power storage device B is a rechargeable DC power supply, and is formed of, e.g., a secondary battery such as a nickel hydrogen battery or a lithium-ion battery. Power storage device B supplies an electric power to inverters 10 and 20, and is charged with a regenerative power provided from inverters 10 and/or 20. Power storage device B may be a capacitor of a large capacity.

Smoothing capacitor C1 smoothes a voltage between positive and negative lines PL and NL. A capacitance C3 represents a stray capacitance between positive line PL and a vehicle ground 80. A capacitance C4 represents a stray capacitance between negative line NL and vehicle ground 80. Vehicle ground 80 may be a vehicle frame, a vehicle body or the like.

Based on a signal PWM1 provided from ECU 30, inverter 10 converts a DC voltage supplied from power storage device B into a three-phase AC voltage, and provides it to motor generator MG1. Further, inverter 10 converts a three-phase AC voltage generated by motor generator MG1 that uses the power of engine 2 into a DC voltage, and provides it to positive and negative lines PL and NL.

Based on a signal PWM2 provided from ECU 30, inverter 20 converts the DC voltage supplied from power storage device B into a three-phase AC voltage, and provides the three-phase voltage thus converted to motor generator MG2. Also, during regenerative braking of the vehicle, inverter 20 converts a three-phase AC voltage generated by motor generator MG2 using a rotation force of wheels 6 into a DC voltage, and provides it to positive and negative lines PL and NL.

When it is requested to charge power storage device B by load 90 serving as the power supply (e.g., a system power supply) outside the vehicle, inverters 10 and 20 covert the AC power supplied from load 90 to neutral points N1 and N2 via plug 70, AC port 60 and power lines ACL1 and ACL2 into the DC power, and provide it to positive and negative lines PL and NL to charge power storage device B. When it is requested to supply the electric power to load 90 serving as an AC electric load (e.g., a home electric appliance), inverters 10 and 20 generate an AC voltage having a predetermined frequency (e.g., a commercial power frequency) across neutral points N1 and N2, and the AC power is provided from plug 70 to load 90.

Each of motor generators MG1 and MG2 is a three-phase AC electric rotating machine, and is formed of, e.g., a three-phase permanent magnet synchronous motor having permanent magnets on its rotor. Motor generator MG1 is regeneratively driven by inverter 10 to provide the three-phase AC power generated using the drive power of engine 2 to inverter 10. Also, for starting engine 2, motor generator MG1 is driven to perform power running by inverter 10, and thereby cranks engine 2. Motor generator MG2 is driven to perform power running by inverter 20, and thereby generates a drive power for driving wheels 6. Further, during the regenerative braking of the vehicle, motor generator MG2 is regeneratively driven by inverter 20 to generate the three-phase AC power using the rotation force of wheels 6, and provides it to inverter 20.

ECU 30 produces a PWM signal for driving inverter 10, and provides the produced PWM signal, as signal PWM1, to inverter 10. ECU 30 produces a PWM signal for driving inverter 20, and provides the produced PWM signal, as a signal PWM2, to inverter 20.

When it is requested to charge power storage device B by load 90 serving as the external power supply, ECU 30 controls inverters 10 and 20 such that inverters 10 and 20 convert the AC power supplied from load 90 to neutral points N1 and N2 into the DC power, and provide it to power storage device B. When it is requested to supply the power to load 90 serving as the AC electric load, ECU 30 controls inverters 10 and 20 such that inverters 10 and 20 generate an AC voltage across neutral points N1 and N2, and provide it to load 90. The control of inverters 10 and 20 for transmitting and receiving the electric power to/from load 90 will be described later in detail.

Smoothing capacitor C2 smoothes a voltage between power lines ACL1 and ACL2. Thus, smoothing capacitor C2 suppresses normal mode noises that occur due to high-frequency switching of inverter 10 or 20 when the electric power is transmitted and received between the vehicle and load 90.

AC port 60 includes a relay (not shown) selectively connecting and disconnecting power lines ACL1 and ACL2 to/from plug 70, a voltage sensor (not shown) sensing a voltage VAC between power lines ACL1 and ACL2, and a current sensor sensing a current IAC flowing through power line ACL1 or ACL2. For transmitting and receiving the electric power between the vehicle and load 90, AC port 60 turns on the relay according to an instruction from ECU 30, and thereby electrically connects plug 70 connected to load 90 to power lines ACL1 and ACL2. AC port 60 provides sensed values of voltage VAC and current IAC to ECU 30.

Plug 70 is a connection terminal for electrically connecting hybrid vehicle 100 to load 90. Load 90 generally represents an external AC power supply for charging power storage device B or an AC electric load for receiving the electric power from hybrid vehicle 100, and is grounded to a ground node 95.

In this hybrid vehicle 100, when the power is to be transmitted and received between the vehicle and load 90, load 90 is electrically connected to neutral points N1 and N2 via power lines ACL1 and ACL2, respectively. When the inverters perform the switching operation, the common mode voltage on vehicle ground 80 varies, and currents of a high frequency may flow due to high-frequency switching of the inverters between positive and negative lines PL and NL and vehicle ground 80 via capacitances C3 and C4, respectively. Thereby, a circuit is formed between the vehicle and load 90 via a contact resistance between vehicle ground 80 and ground node 95, and a high-frequency current corresponding to the variations in common mode voltage may flow between the vehicle and load 90. Therefore, the first embodiment controls inverters 10 and 20 to suppress the variation amount of the common mode voltage.

The description will now be given on a cause of the variations in common mode voltage due to the high-frequency switching of inverters 10 and 20.

Figure 2:
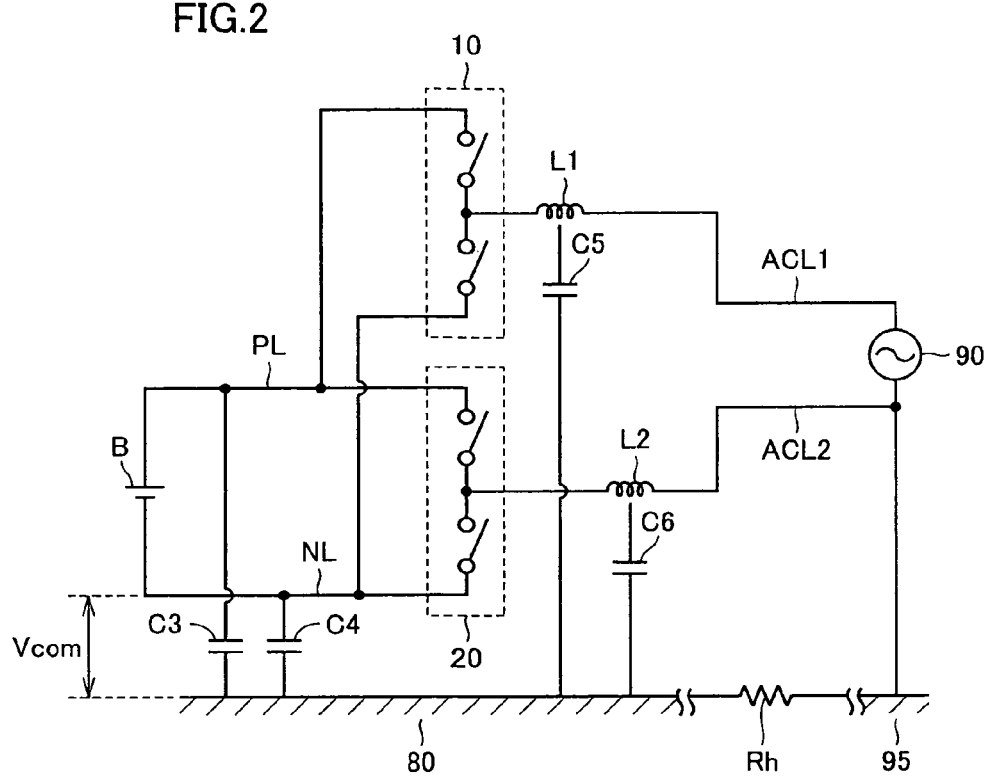
FIG. 2 is an equivalent circuit diagram showing a state where an electric power is transmitted and received between a vehicle and a load in a system shown in FIG. 1.

FIG. 2 is an equivalent circuit diagram of a system that is shown in FIG. 1 and is in a state where the power is transmitted and received between the vehicle and load 90. Although FIG. 2 shows the case where load 90 is the AC power supply, an equivalent circuit formed when load 90 is an AC electric load is substantially the same as the above. Referring to FIG. 2, when power storage device B is charged from load 90, switching control is simultaneously performed on the three phases of each of inverters 10 and 20. In FIG. 2, therefore, three switching elements of an upper arm of each of inverters 10 and 20 are represented in an integrated fashion, and three switching elements of a lower arm are likewise represented in an integrated fashion.

Inductances L1 and L2 indicate leakage inductances of motor generators MG1 and MG2, respectively, and capacitances C5 and C6 indicate stray capacitances between motor generators MG1 and MG2 and vehicle ground 80, respectively. A resistance Rh indicates a contact resistance between vehicle ground 80 and ground node 95. In the following description, it is assumed that a voltage on negative line NL with respect to vehicle ground 80 is a common mode voltage Vcom.

Figure 3:
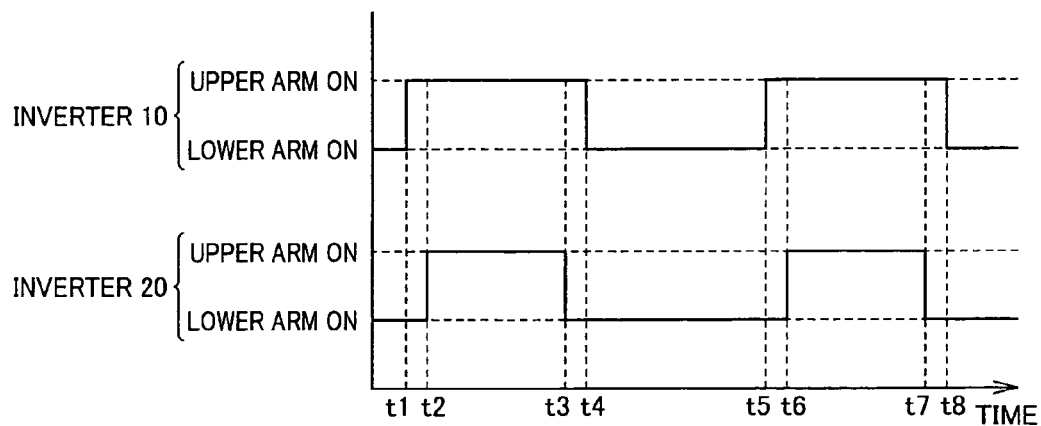
FIG. 3 shows an example of switching states of inverters.

FIG. 3 shows an example of the switching state of inverters 10 and 20. Referring to FIG. 3, the upper arms of both inverters 10 and 20 are on during times t2-t3 and t6-t7. During times t1-t2, t3-t4, t5-t6 and t7-t8, the upper arm of inverter 10 is on, and the lower arm of inverter 20 is on. Before time t1, during times t4-t5 and after time t8, the lower arms of both inverters 10 and 20 are on.

The above changes in switching pattern of inverters 10 and 20 cause variations in common mode voltage Vcom.

Figure 4:
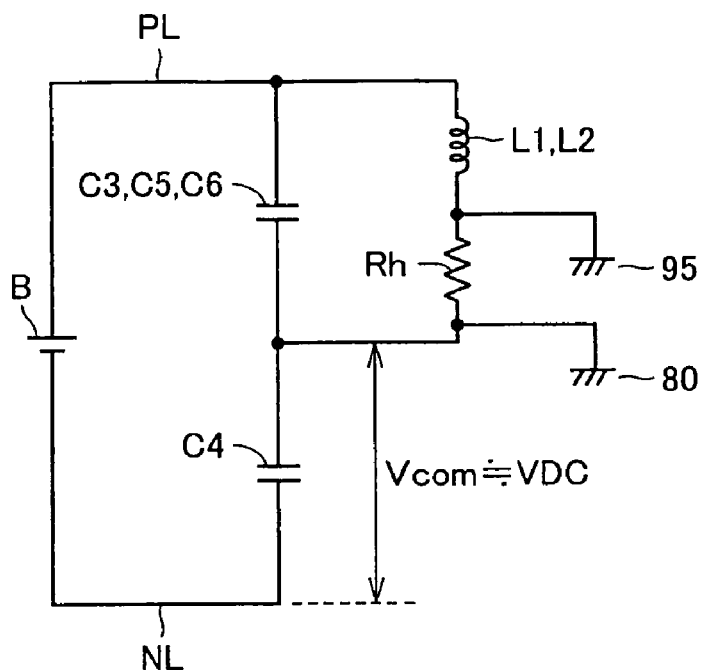
FIG. 4 is an equivalent circuit diagram showing a state where an upper arm of each inverter is on in the circuit shown in FIG. 2.

FIG. 4 is an equivalent circuit diagram showing a state where the upper arms of both inverters 10 and 20 are on in the circuit shown in FIG. 2. Referring to FIG. 4, when the upper arms of both inverters 10 and 20 are on, an electric circuit successively passing through leakage inductances L1 and L2, (power lines ACL1 and ALC2,) ground node 95 and contact resistance Rh is formed between positive line PL and vehicle ground 80. In parallel with the above electric circuit, an electric circuit passing through capacitances C3, C5 and C6 is formed between positive line PL and vehicle ground 80. An electric circuit passing through capacitance C4 is formed between vehicle ground 80 and negative line NL.

In the above state, common mode voltage Vcom (a voltage between negative line NL and vehicle ground 80) is substantially equal to a voltage VDC (corresponding to a voltage of power storage device B) although leakage inductances L1 and L2 as well as contact resistance Rh slightly cause voltage drop.

Figure 5:
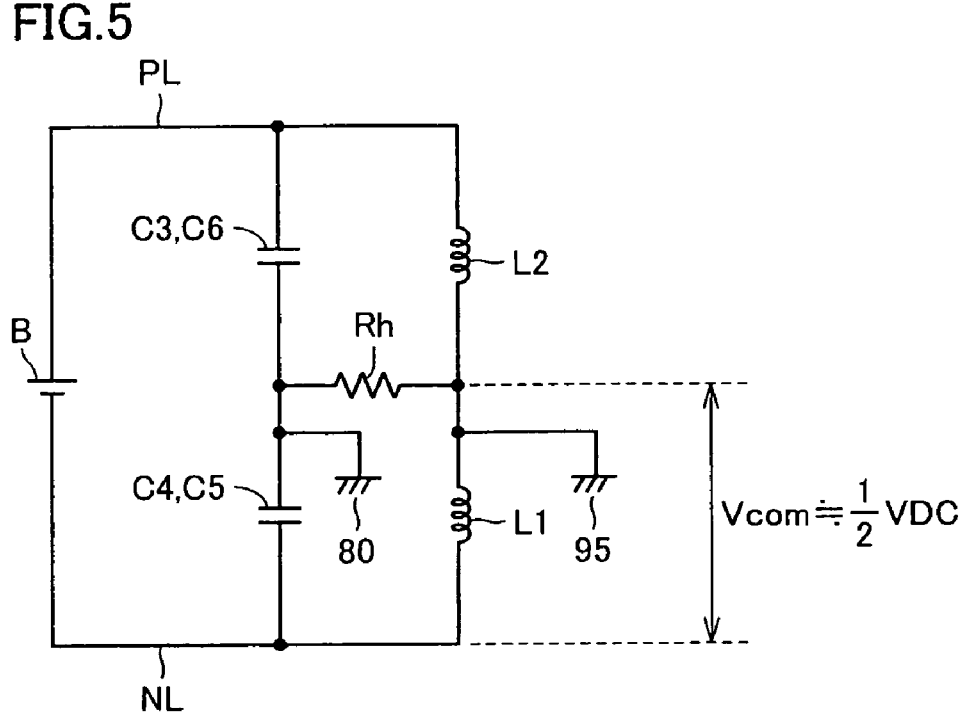
FIG. 5 is an equivalent circuit diagram showing a state where the upper arm of one of the inverters is on and a lower arm of the other inverter is on in the circuit shown in FIG. 2.

FIG. 5 is an equivalent circuit diagram showing a state where the upper arm of one of the inverters is on and the lower arm of the other inverter is on that in the circuit shown in FIG. 2. Particularly, FIG. 5 shows a state where the lower arm of inverter 10 is on and the upper arm of inverter 20 is on. Referring to FIG. 5, since the upper arm of inverter 20 is on, an electric circuit passing through leakage inductance L2, (power line ACL2,) ground node 95 and contact resistance Rh is formed between positive line PL and vehicle ground 80. In parallel with the above electric circuit, an electric circuit passing through capacitances C3 and C6 is formed between positive line PL and vehicle ground 80.

Also, the lower arm of inverter 10 is on so that an electric circuit passing through leakage inductance L1, (power line ACL1,) ground node 95 and contact resistance Ph is formed between negative line NL and vehicle ground 80. In parallel with this electric circuit, an electric circuit passing through capacitances C4 and C5 is formed between negative line NL and vehicle ground 80.

In this state, common mode voltage Vcom is substantially equal to VDC/2 when the inductances of leakage inductances L1 and L2 are substantially equal to each other.

Although not shown, common mode voltage Vcom is also substantially equal to VDC/2 when the upper arm of inverter 10 and the lower arm of inverter 20 are on.

Figure 6:
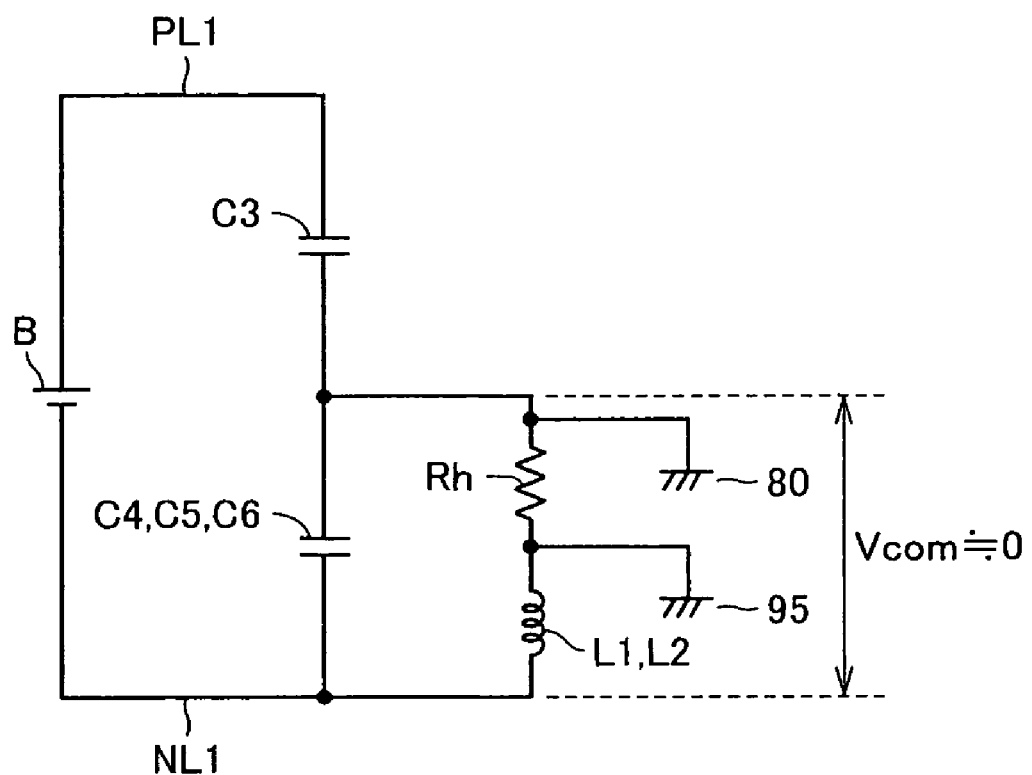
FIG. 6 is an equivalent circuit diagram showing a state where the lower arm of each inverter is on in the circuit shown in FIG. 2.

FIG. 6 is an equivalent circuit diagram showing a state where the lower arms of both inverters 10 and 20 are on in the circuit shown in FIG. 2. Referring to FIG. 6, when the lower arms of both inverters 10 and 20 are on, an electric circuit passing through leakage inductances L1 and L2, (power lines ACL1 and ACL2,) ground node 95 and contact resistance Rh is formed between negative line NL and vehicle ground 80. In parallel with the above electric circuit, an electric circuit passing through capacitances C4, C5 and C6 is formed between negative line NL and vehicle ground 80. An electric circuit passing through capacitance C3 is formed between positive line PL and vehicle ground 80.

In this state, common mode voltage Vcom becomes substantially equal to zero although leakage inductances L1 and L2 and contact resistance Rh slightly cause the voltage drop.

When the above state where the upper arms of both inverters 10 and 20 are on and the state where the lower arms of both inverters 10 and 20 are on are repeated, common mode voltage Vcom varies with an amplitude corresponding to voltage VDC across positive and negative lines PL and NL. Accordingly, when the electric power is transmitted and received between the vehicle and load 90, the only one of inverters 10 and 20 is PWM-controlled and the other inverter attains the conducting state without being PWM-controlled as will be described later. Thereby, the first embodiment suppresses the variations in common mode voltage Vcom.

Figure 7:
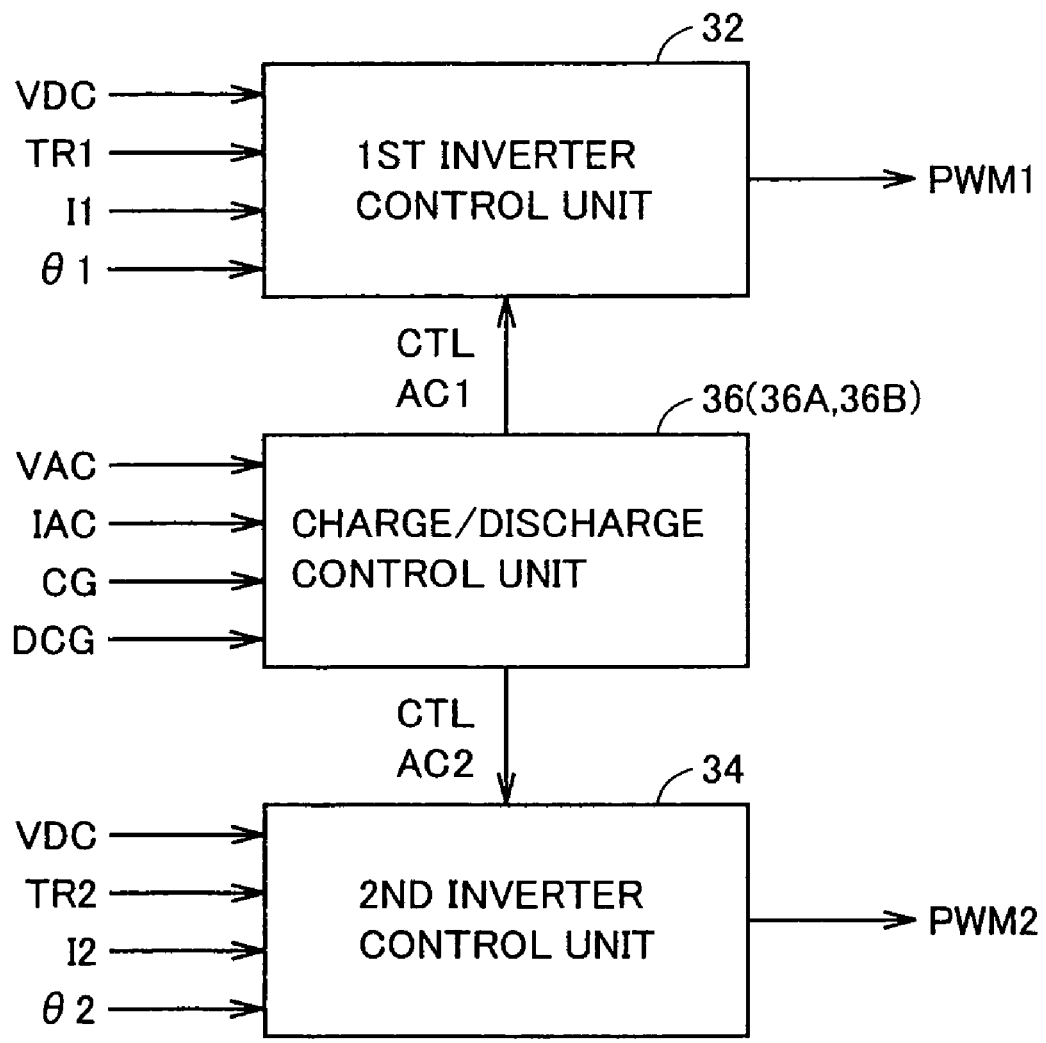
FIG. 7 is a function block diagram of an ECU shown in FIG. 1.

FIG. 7 is a function block diagram of ECU 30 shown in FIG. 1. Referring to FIG. 7, ECU 30 includes first and second inverter control units 32 and 34 as well as a charge/discharge control unit 36. When a signal CTL provided from charge/discharge control unit 36 is inactive, first inverter control unit 32 produces a PWM signal for driving motor generator MG1 based on a sensed value of voltage VDC across positive and negative lines PL and NL and a torque instruction value TR1 of motor generator MG1 as well as respective sensed values of a motor current I1 and a rotation angle θ1 of motor generator MG1, and provides the PWM signal thus produced to inverter 10 as signal PWM1.

When signal CTL provided from charge/discharge control unit 36 is inactive, second inverter control unit 34 produces a PWM signal for driving motor generator MG2 based on the sensed value of voltage VDC and a torque instruction value TR2 of motor generator MG2 as well as respective sensed values of a motor current I2 and a rotation angle θ2 of motor generator MG2, and provides the PWM signal thus produced to inverter 20 as signal PWM2.

When signal CTL from charge/discharge control unit 36 is active, first and second inverter control units 32 and 34 produce signals PWM1 and PWM2 for transmitting and receiving the electric power between the vehicle and load 90 outside the vehicle via neutral points N1 and N2 based on instructions AC1 and AC2 provided from charge/discharge control unit 36, and provide the produced signals PWM1 and PWM2 to inverters 10 and 20, respectively.

When a signal CG instructing the charging of power storage device B by load 90 is active, charge/discharge control unit 36 activates signal CTL provided to first and second inverter control units 32 and 34. Based on voltage VAC and current IAC sensed at AC port 60, charge/discharge control unit 36 produces instructions AC1 and AC2 for controlling inverters 10 and 20 to convert the AC power that is provided to neutral points N1 and N2 from load 90 into the DC power and to provide it to power storage device B, and provides instructions AC1 and AC2 thus produced to first and second inverter control units 32 and 34, respectively.

More specifically, according to the sign of voltage VAC, charge/discharge control unit 36 produces instructions AC1 and AC2 to PWM-control one of inverters 10 and 20 based on voltage VAC and current IAC, and to electrify the other inverter. More specifically, when voltage VAC is positive (i.e., when the voltage on power line ACL1 is higher than that on power line ACL2), charge/discharge control unit 36 produces instruction AC1 for PWM-controlling inverter 10 based on voltage VAC and current IAC, and produces instruction AC2 for inverter 20 to keep continuously its lower arm on. When voltage VAC is negative, charge/discharge control unit 36 produces, based on voltage VAC and current IAC, instruction AC2 for PWM-controlling inverter 20, and produces instruction AC1 for inverter 10 to keep continuously its lower arm on. Thus, in synchronization with voltage VAC, charge/discharge control unit 36 performs the PWM control on one of inverters 10 and 20 based on voltage VAC and current IAC, and controls the other inverter to keep it continuously in the conducting state.

It is assumed that the frequency of the AC power supplied from load 90 is much lower than the carrier frequency in the PWM control, i.e., the switching frequency of the PWM-controlled inverter. More specifically, in each of inverters 10 and 20, the switching between the PWM control and the conducting state is performed according to the supply direction of the AC power from load 90, and it is assumed that the frequency for such switching is much lower than the switching frequency by the PWM control. For example, the frequency of the AC power supplied from load 90 is a commercial power frequency, and the switching frequency of the PWM-controlled inverter is nearly in a range from several kilohertz to 10 kilohertz.

When a signal DCG instructing the power supply from neutral points N1 and N2 to load 90 is active, charge/discharge control unit 36 activates signal CTL provided to first and second inverter control units 32 and 34. Charge/discharge control unit 36 produces instructions AC1 and AC2 for controlling inverters 10 and 20 to generate a voltage difference having a predetermined frequency across neutral points N1 and N2, and provides instructions AC1 and AC2 thus produced to first and second inverter control units 32 and 34, respectively.

More specifically, according to the sign of the voltage difference generated across neutral points N1 and N2, charge/discharge control unit 36 produces instructions AC1 and AC2 that PWM-control one of inverters 10 and 20 to cause the voltage difference having the predetermined frequency across neutral points N1 and N2, and set the other inverter to the conducting state. Further specifically, when the voltage difference generated across neutral points N1 and N2 is positive (i.e., when the potential of neutral point N1 is higher than that of neutral point N2), charge/discharge control unit 36 produces instruction AC1 for PWM-controlling inverter 10, and also produces instruction AC2 for inverter 20 to keep continuously its lower arm in the on state. Conversely, when the voltage difference generated across neutral points N1 and N2 is negative, charge/discharge control unit 36 produces instruction AC2 for PWM-controlling inverter 20, and produces instruction AC1 for inverter 10 to keep continuously its lower arm in the on state. Thus, charge/discharge control unit 36 PWM-controls one of inverters 10 and 20, and controls the other inverter to keep continuously the conducting state in synchronization with the voltage difference generated across neutral points N1 and N2.

It is assumed that the frequency of the voltage difference generated across neutral points N1 and N2 is much lower than the switching frequency of the PWM-controlled inverter. For example, the switching frequency of the PWM-controlled inverter is in a range from several kilohertz to 10 kilohertz as already described, and the voltage difference generated across neutral points N1 and N2 has a commercial power frequency.

For example, signal CG becomes active when a user instructs the start of charging while plug 70 is connected to load 90, and signal DCG becomes active when the user instructs the start of power feeding while plug 70 is connected to load 90.

Figure 8:
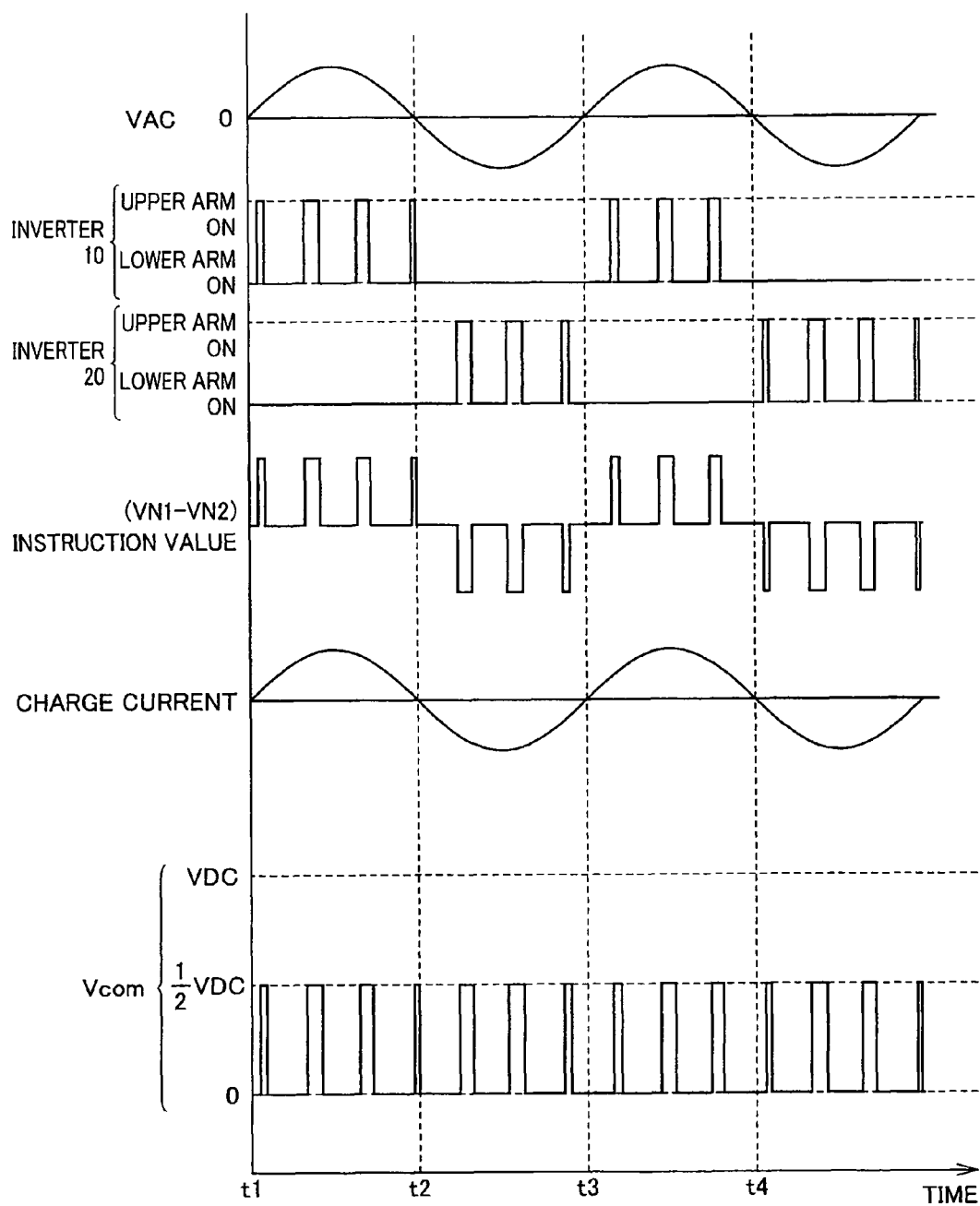
FIG. 8 is a waveform diagram showing switching states of respective inverters and variations in common mode voltage.

FIG. 8 is a waveform diagram showing switching states of respective inverters 10 and 20 as well as variations in common mode voltage Vcom. Although FIG. 8 shows the waveform exhibited when the charging from load 90 to power storage device B is performed, a similar waveform is exhibited when the power is fed from the vehicle to load 90. Referring to FIG. 8, during times t1-t2 and t3-t4, i.e., when voltage VAC indicating the voltage of load 90 that is the AC power supply is positive, inverter 10 is PWM-controlled based on voltage VAC and current IAC, and inverter 20 is controlled to keep continuously its lower arm in the on state (conducting state). During times t2-t3 and after time t4, i.e., when voltage VAC is negative, inverter 20 is PWM-controlled, and inverter 10 is controlled to keep continuously its lower arm in the on state (conducting state).

Therefore, the instruction value of the voltage difference (VN1-VN2) across neutral points N1 and N2 takes the form shown in the figure, and the charge current synchronized with voltage VAC can be obtained from load 90.

During times t1-t2 and t3-t4, inverter 10 performs the switching operation under the PWM control, but inverter 20 has the lower arm in the on state so that common mode voltage Vcom varies between 0 and VDC/2 (FIGS. 5 and 6). Thus, common mode voltage Vcom never swings to the near of voltage VDC. This is because the lower arm of inverter 20 is always in the on state (conducting state) so that neither of the upper arms of inverters 10 and 20 attains the on state (FIG. 4).

During times t2-t3 and after time t4, inverter 20 performs the switching operation under the PWM control, but inverter 10 has the lower arm in the on state so that common mode voltage Vcom varies between 0 and VDC/2, similarly to times t1-t2 and t3-t4. This is likewise because neither of the upper arms of inverters 10 and 20 attains the on state (FIG. 4).

Figure 9:
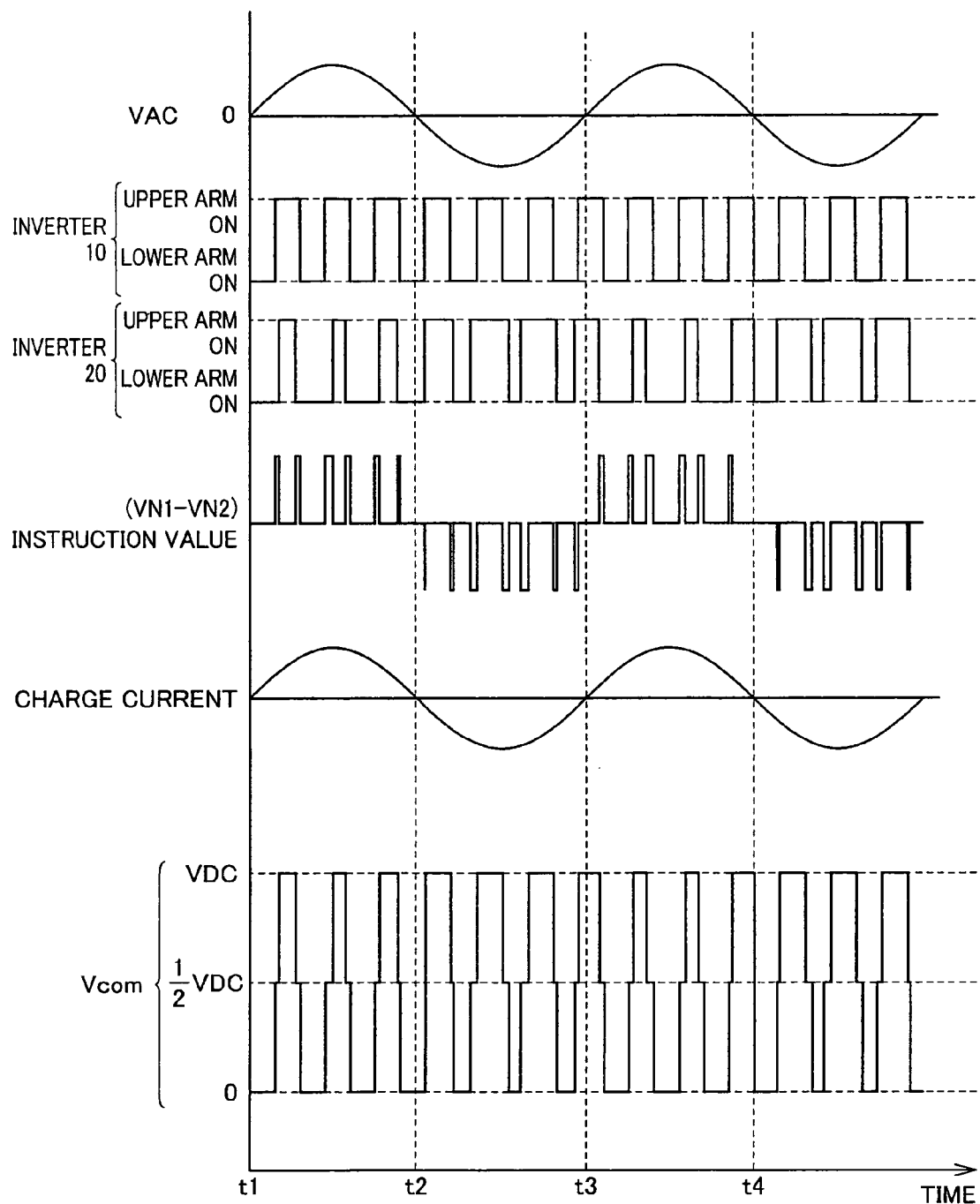
FIG. 9 is a waveform diagram showing the switching states of the respective inverters and variations in common mode voltage that would appear if both inverters were PMW-controlled.

FIG. 9 is a waveform diagram showing the switching states of respective inverters 10 and 20 as well as variations in common mode voltage Vcom that would appear if both inverters 10 and 20 were PWM-controlled. More specifically, FIG. 9 relates to a conventional method. Referring to FIG. 9, when both inverters 10 and 20 are continuously PWM-controlled, this PMW-control causes a state in which both the upper arms of inverters 10 and 20 are on occurs as well as a state in which both the lower arms of inverters 10 and 20 are on. Therefore, common mode voltage Vcom varies between 0 and VDC.

According to the first embodiment, therefore, when the power is transmitted and received between the vehicle and load 90, the PWM control is not performed on both inverters 10 and 20, and is performed on only one of inverters 10 and 20 while controlling the other inverter to keep continuously the conducting state. In synchronization with the power (AC power) transmitted and received between the vehicle and load 90, the inverters are alternately set to the conducting state (and thus are alternately PWM-controlled) so that common mode voltage Vcom varies between 0 and VDC/2.

Therefore, the first embodiment can reduce by half the variation amount of the common mode voltage, as compared with the conventional method in which both inverters 10 and 20 are PWM-controlled. Consequently, it is not necessary to arrange, on power lines ACL1 and ACL2, a filter for reducing the common mode noises, and increase in size of the system can be suppressed.

In the above description, when voltage VAC is positive, inverter 10 is PWM-controlled, and the lower arm of inverter 20 is always on. When voltage VAC is negative, inverter 20 is PWM-controlled, and the lower arm of inverter 10 is always on. However, the following configuration may be employed. When voltage VAC is positive, inverter 20 is PWM-controlled, and the upper arm of inverter 10 is always on. When voltage VAC is negative, inverter 10 is PWM-controlled, and the upper arm of inverter 20 is always on. In this case, common mode voltage Vcom varies between VDC/2 and VDC (with a variation amount of VDC/2).

Second Embodiment

In the first embodiment, as shown in FIG. 8, when the electric power is transmitted and received between the vehicle and load 90, the inverter attaining the conducting state is alternately selected in synchronization with the transmitted and received power. Thus, during times t1-t2 and t3-t4, inverter 10 is PWM-controlled and inverter 20 is set to the conducting state (to keep the lower arm on). During times t2-t3 and after time t4, inverter 20 is PWM-controlled and inverter 10 is set to the conducting state (to keep the lower arm on).

In the second embodiment, when the power transmission is performed between the vehicle and load 90, one of inverters 10 and 20 is PWM-controlled, and the upper and lower arms of the other inverter are alternately set to the on state in synchronization with the transmitted and received electric power. Thus, in the second embodiment, the PWM-controlled inverter and the inverter controlled to attain the conducting state are fixed, and the inverter controlled to attain the conducting state operates such that the upper and lower arms are alternately turned on in synchronization with the electric power transmitted and received between the vehicle and load 90.

When whole structure of the hybrid vehicle according to the second embodiment is the same as that of hybrid vehicle 100 shown in FIG. 1.

Referring to FIG. 7 again, ECU 30 in the second embodiment differs in structure from the ECU in the first embodiment in that charge/discharge control unit 36 is replaced with charge/discharge control unit 36A. When a signal CG is active, charge/discharge control unit 36A produces instructions AC1 and AC2 to PWM-control inverter 20 based on voltage VAC and current IAC, and to electrify inverter 10.

More specifically, when voltage VAC is positive, charge/discharge control unit 36A produces instruction AC2 based on voltage VAC and current IAC for PWM-controlling inverter 20, and produces instruction AC1 for continuously keeping the upper arm of inverter 10 in the on state. When voltage VAC is negative, charge/discharge control unit 36A produces instruction AC2 for PWM-controlling inverter 20, and also produces instruction AC1 for continuously keeping the lower arm of inverter 10 in the on state. Thus, charge/discharge control unit 36A PWM-controls inverter 20 based on voltage VAC and current IAC, and controls inverter 10 to keep continuously the conducting state by alternately turning on the upper and lower arms of inverter 10 according to the sign of voltage VAC.

Similarly to the first embodiment, it is assumed that the on/off switching frequency of inverter 10, i.e., the frequency of the AC power supplied from load 90 is much lower than the switching frequency of PWM-controlled inverter 20.

When signal DCG is active, charge/discharge control unit 36A produces instructions AC1 and AC2 that PWM-control inverter 20 to generate the voltage difference having the predetermined frequency across neutral points N1 and N2, and keep inverter 10 in the conducting state.

More specifically, when the voltage difference to be generated across neutral points N1 and N2 is positive, charge/discharge control unit 36A produces instruction AC2 for PWM-controlling inverter 20, and produces instruction AC1 for inverter 10 to keep continuously its upper arm in the on state. When the voltage difference to be generated across neutral points N1 and N2 is negative, charge/discharge control unit 36A produces instruction AC2 for PWM-controlling inverter 20, and produces instruction AC1 for inverter 10 to keep continuously its lower arm in the on state. Thus, charge/discharge control unit 36A PWM-controls inverter 20 based on the voltage difference generated across neutral points N1 and N2, and controls inverter 10 to be always in the on state by alternately turning on the upper and lower arms of inverter 10 in response to the sign of the voltage difference to be generated across neutral points N1 and N2.

Similarly to the first embodiment, it is assumed that the on/off switching frequency of the upper and lower arms of inverter 10, i.e., the frequency of the voltage difference generated across neutral points N1 and N2 is much lower than the switching frequency of PWM-controlled inverter 20.

Other structures of charge/discharge control unit 36A are the same as those of charge/discharge control unit 36.

Figure 10:
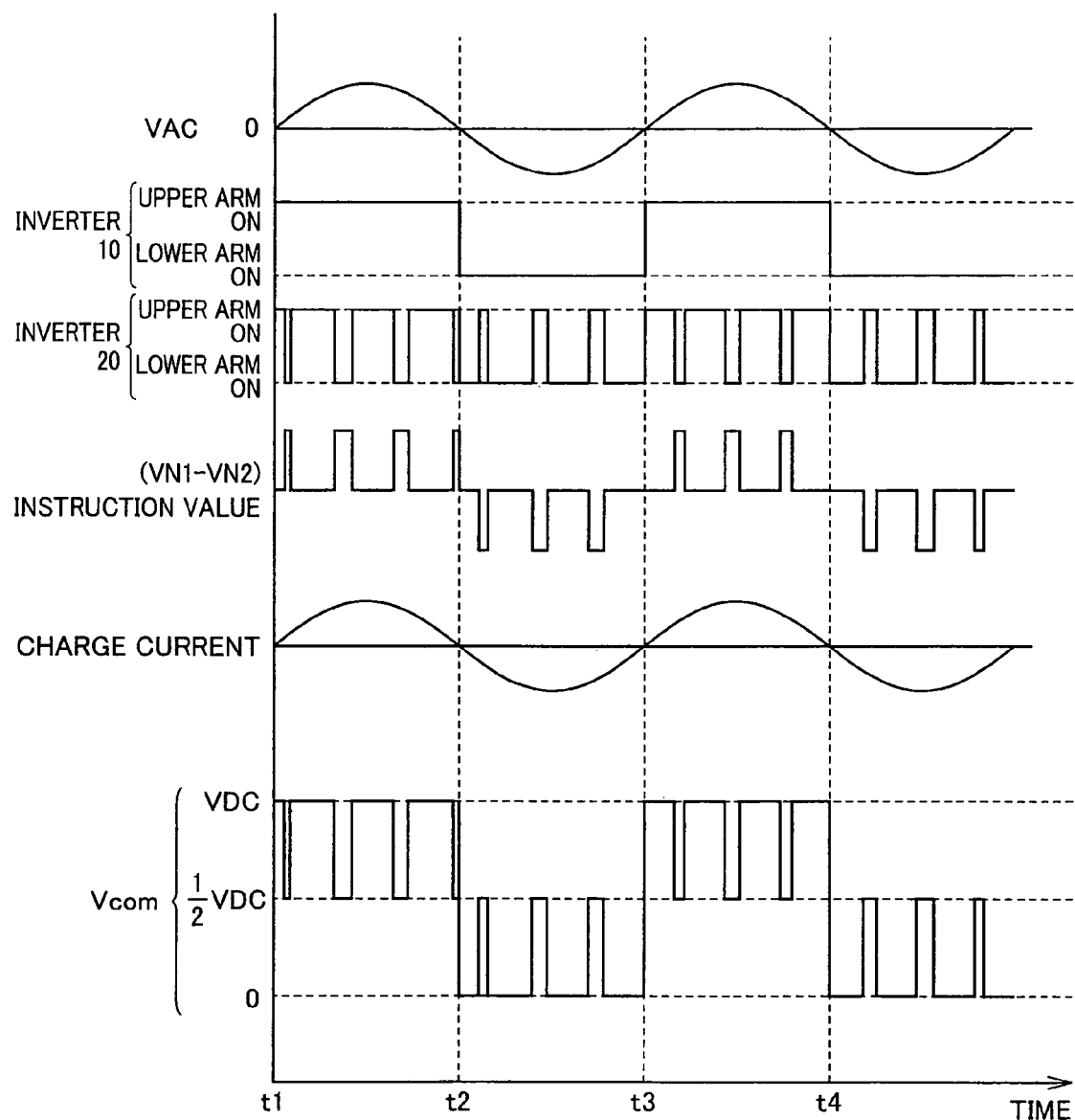
FIG. 10 is a waveform diagram showing switching states of respective inverters and variations in common mode voltage in a second embodiment.

FIG. 10 is a waveform diagram showing switching states of respective inverters 10 and 20 and variations in common mode voltage Vcom in the second embodiment. FIG. 10 corresponds to FIG. 8 already described in the first embodiment. Although FIG. 10 likewise shows the waveform diagram exhibited when load 90 charges power storage device B, a similar waveform is exhibited when the power is supplied to load 90.

Referring to FIG. 10, while voltage VAC is positive, i.e., during times t1-t2 and t3-t4, inverter 10 is controlled to keep continuously its upper arm in the on state (conducting state), and inverter 20 is PWM-controlled based on voltage VAC and current IAC. When voltage VAC is negative, i.e., during times t2-t3 and after time 4, inverter 10 is controlled to keep continuously its lower arm in the on state (conducting state), and inverter 20 is PWM-controlled.

Therefore, the instruction value of the voltage difference (VN1-VN2) across neutral points N1 and N2 takes a form shown in the figure, and the charge current synchronized with voltage VAC can be obtained from load 90.

During times t1-t2 and t3-t4, the upper arm of inverter 10 is on so that common mode voltage Vcom varies between VDC/2 and VDC. Thus, common mode voltage Vcom never swings to the near of zero. This is because the upper arm of inverter 10 is always in the on state (conducting state) so that neither of the lower arms of inverters 10 and 20 attains the on state (FIG. 6).

During times t2-t3 and after time t4, the lower arm of inverter 10 is on so that common mode voltage Vcom varies between 0 and VDC/2. Thus, common mode voltage Vcom never swings to the near of VDC. This is because the lower arm of inverter 10 is always in the on state (conducting state) so that neither of the upper arms of inverters 10 and 20 attains the on state (FIG. 4).

In the above description, when the electric power is transmitted and received between the vehicle and load 90, inverter 20 is PWM-controlled, and inverter 10 is continuously kept in the conducting state. However, inverter 10 may be PWM-controlled, and inverter 20 may be continuously kept in the conducting state.

As described above, the second embodiment can reduce the variation amount of the common mode voltage by half, as compared with the conventional method that performs the PWM control on both inverters 10 and 20 when the electric power is transmitted and received between the vehicle and load 90. Further, the second embodiment can fix the inverter to be PWM-controlled and the inverter to be controlled to stay in the conducting state without performing the switching between them, and thus allows easier control than the first embodiment.

Third Embodiment

In a third embodiment, when the electric power is transmitted and received between the vehicle and load 90, one of inverters 10 and 20 is PWM-controlled, and the other inverter is shut down (i.e., all arms are off).

The whole structure of the hybrid vehicle according to the third embodiment is the same as that of hybrid vehicle 100 shown in FIG. 1.

Referring to FIG. 7, ECU 30 in the third embodiment differs in structure from the ECU in the first embodiment in that charge/discharge control unit 36 is replaced with a charge/discharge control unit 36B. When signal CG is active, charge/discharge control unit 36B produces, based on voltage VAC and current IAC, instruction AC2 for PWM-controlling inverter 20, and produces instruction AC1 for shutting down inverter 10.

When signal DCG is active, charge/discharge control unit 36B produces instruction AC2 for PWM-controlling inverter 20 to generate a voltage difference having a predetermined frequency across neutral points N1 and N2, and produces instruction AC1 for shutting down inverter 10.

Other structures of charge/discharge control unit 36B are the same as those of charge/discharge control unit 36.

Figure 11:
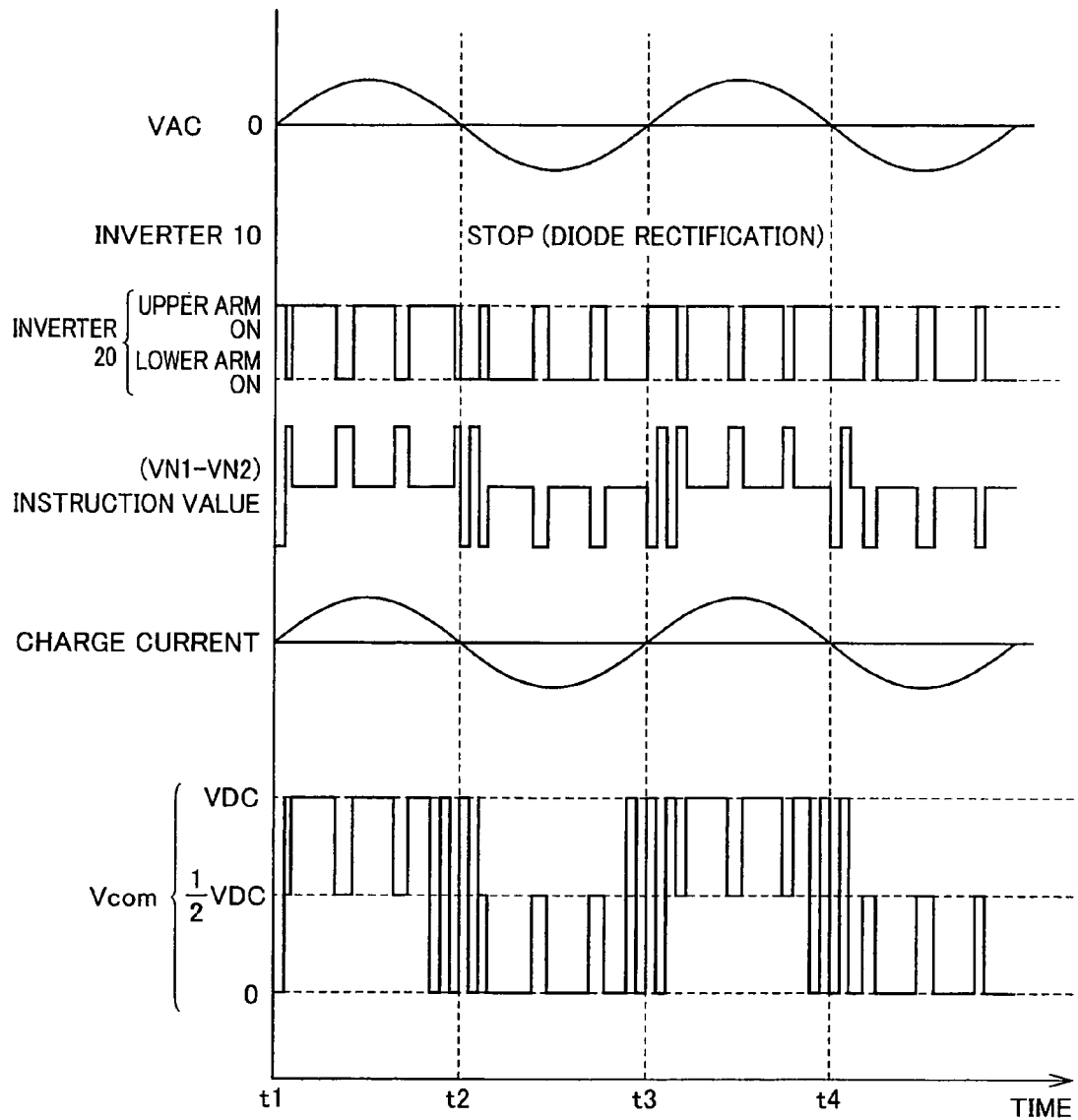
FIG. 11 is a waveform diagram showing switching states of respective inverters and variations in common mode voltage in a third embodiment.

FIG. 11 is a waveform diagram showing switching states of respective inverters 10 and 20 as well as variations in common mode voltage Vcom in the third embodiment. FIG. 11 corresponds to FIG. 8 already described in the first embodiment. Although FIG. 11 shows the waveform exhibited when load 90 charges power storage device B, a similar waveform is exhibited when the power is supplied to load 90.

Referring to FIG. 11, inverter 20 is PWM-controlled based on voltage VAC and current IAC, and inverter 10 continuously keeps the shut-down state (i.e., all arms stop the switching). Since inverter 10 has anti-parallel diodes in each arm, inverter 10 keeps the conducting state even when it is shut down. However, such a situation occurs that the current flowing through inverter 10 becomes discontinuous at the time of inversion of voltage VAC. Therefore, common mode voltage Vcom significantly varies at the time of voltage inversion.

As a whole, however, the variation amount of common mode voltage Vcom is smaller than that in the conventional manner (FIG. 9) that controls both inverters 10 and 20.

In the above description, when the electric power is transmitted and received between the vehicle and load 90, inverter 20 is PWM-controlled, and inverter 10 is continuously kept in the shut-down state. However, inverter 10 may be PWM-controlled, and inverter 20 may be continuously kept in the shut-down state.

As described above, the third embodiment can reduce the variation of the common mode voltage, as compared with the conventional method that performs the PWM control on both inverters 10 and 20 when the electric power is transmitted and received between the vehicle and load 90. Further, the third embodiment continuously shuts down one of the inverters so that the control can be easier than the first and second embodiments.

Fourth Embodiment

Figure 12:
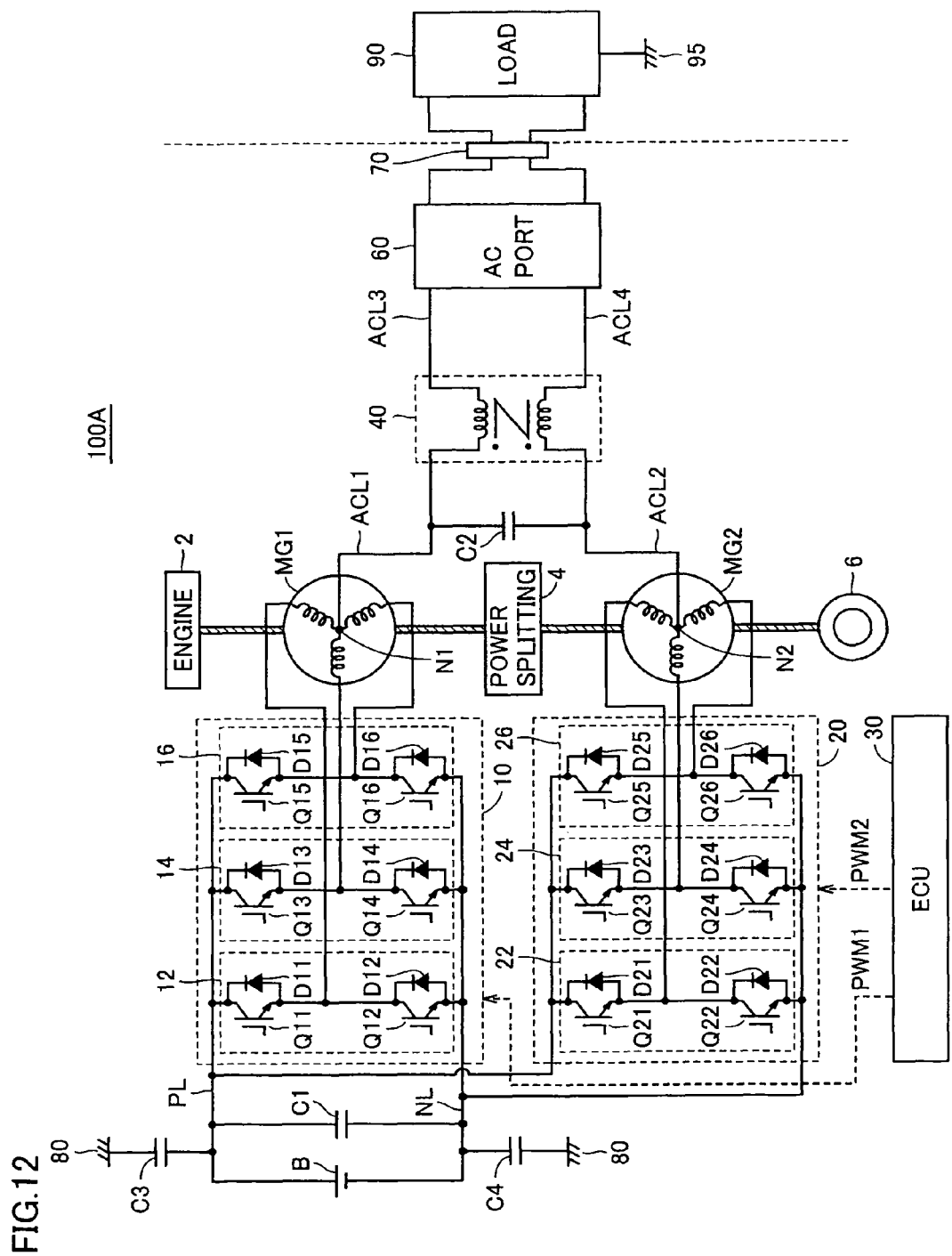
FIG. 12 is a whole block diagram of a hybrid vehicle represented as an example of a vehicle of a fourth embodiment.

FIG. 12 is a whole block diagram of a hybrid vehicle represented as an example of a vehicle of a fourth embodiment. Referring to FIG. 12, hybrid vehicle 100A has the same structure as hybrid vehicle 100 of the first embodiment shown in FIG. 1, and further includes a common mode choke coil 40.

Common mode choke coil 40 is provided between power lines ACL1 and ACL2 and power lines ACL3 and ACL4 connected to AC port 60. Common mode choke coil 40 is formed of an annular ferrite core and two coils (not shown) wound oppositely to each other, and prevents transmission of a common mode voltage from power lines ACL1 and ACL2 to power lines ACL3 and ACL4.

Other structures of hybrid vehicle 100A are the same as those of hybrid vehicle 100 of the first embodiment. Thus, when the electric power is transmitted and received between hybrid vehicle 100A and load 90, one of inverters 10 and 20 is PWM-controlled, and the other is controlled to keep continuously the conducting state. Therefore, the variation amount of the common mode voltage is smaller than that in the conventional method that PWM-controls both inverters 10 and 20.

Since the fourth embodiment further employs common mode choke coil 40, this embodiment can suppress extremely effectively the common mode noises. Since the inverter control is configured to reduce the variation amount of the common mode voltage, common mode choke coil 40 can be small in size.

Fifth Embodiment

Figure 13:
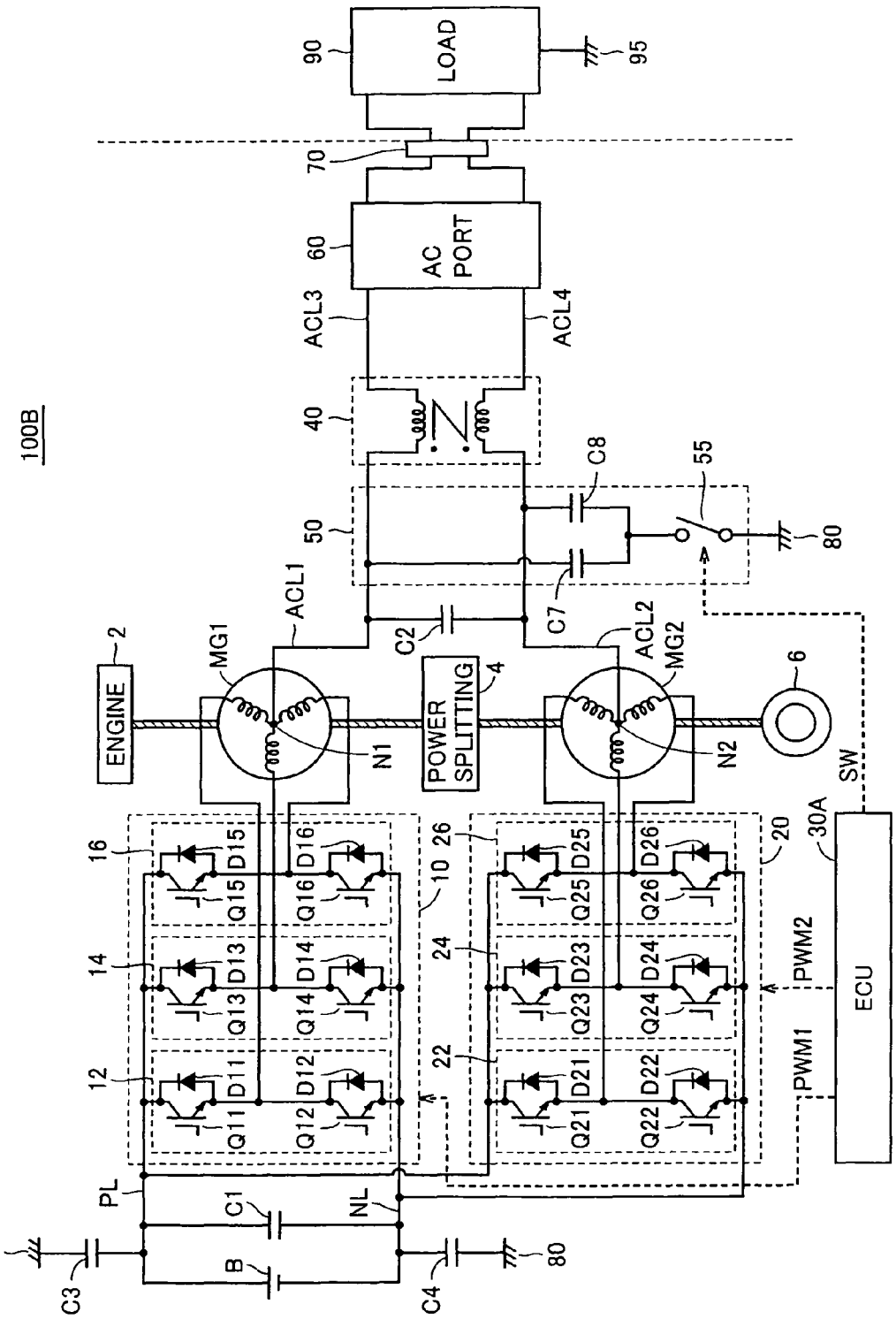
FIG. 13 is a whole block diagram of a hybrid vehicle represented as an example of a vehicle of a fifth embodiment.

FIG. 13 is a whole block diagram of a hybrid vehicle represented as an example of a vehicle of a fifth embodiment. Referring to FIG. 13, a hybrid vehicle 100B has substantially the same structure as hybrid vehicle 100A of the fourth embodiment shown in FIG. 12 except for that hybrid vehicle 100B further includes a Y-capacitor 50 and also includes ECU 30A instead of ECU 30.

Y-capacitor 50 includes capacitors C7 and C8 as well as a relay 55. An end of capacitor C7 is connected to power line ACL1. An end of capacitor C8 is connected to power line ACL2. The other end of each of capacitors C7 and C8 is connected to an end of relay 55, of which other end is connected to vehicle ground 80. Relay 55 is turned on/off in response to a signal SW provided from ECU 30A.

When the electric power is supplied from neutral points N1 and N2 to load 90, ECU 30A turns on relay 55 to activate Y-capacitor 50. When power storage device B is charged from load 90, ECU 30A turns off relay 55 to isolate electrically Y-capacitor 50 from vehicle ground 80. Other structures of ECU 30A are the same as those of ECU 30.

In hybrid vehicle 100B, when the power is supplied from neutral points N1 and N2 to load 90, relay 55 is turned on to activate Y-capacitor 50 as a common mode voltage reduction filter. Thereby, the common mode noises are suppressed more effectively.

When power storage device B is charged from load 90, relay 55 is turned off, and Y-capacitor 50 is electrically isolated from vehicle ground 80. Since capacitors C7 and C8 (of large capacitances) are designed for reducing the common mode voltage of a high frequency caused by high-frequency switching of inverter 10 or 20, relay 55 is turned off as described above for preventing flow of the AC current to vehicle ground 80 via Y-capacitor 50 from load 90 of which frequency is lower than the switching frequency of inverters 10 and 20.

As described above, the fifth embodiment further includes Y-capacitor 50, and can suppress extremely effectively the common mode noises when the power is supplied from the vehicle to load 90. When the power is supplied from load 90 to the vehicle, Y-capacitor 50 is electrically isolated from vehicle ground 80 so that it is possible to prevent the flow of the current supplied from load 90 to vehicle ground 80. In the operation of supplying the electric power from load 90 to the vehicle, this embodiment can effectively suppress the common mode noises similarly to the fourth embodiment.

Sixth Embodiment

Figure 14:
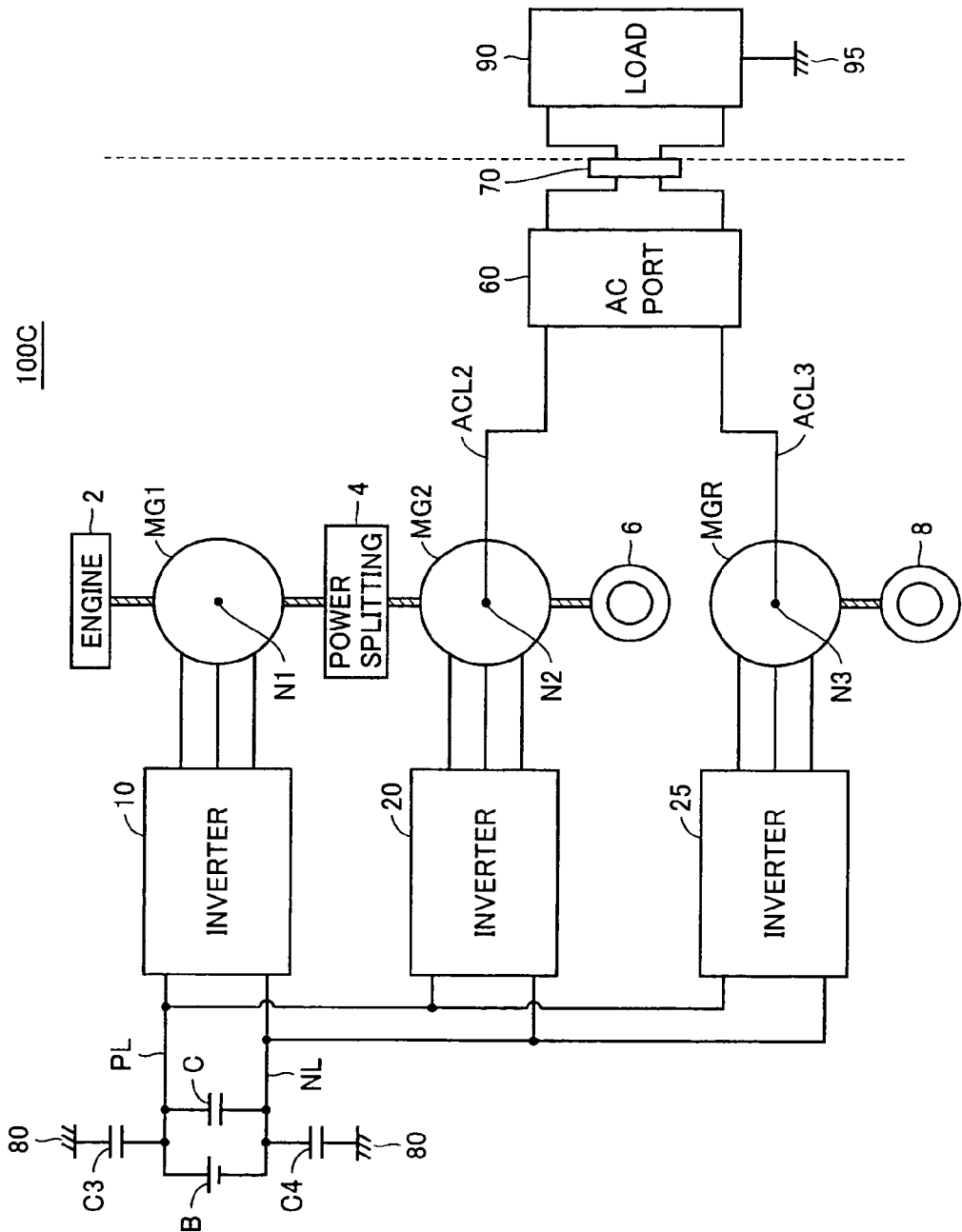
FIG. 14 is a whole block diagram of a hybrid vehicle represented as an example of a vehicle of a sixth embodiment.

FIG. 14 is a whole block diagram of a hybrid vehicle represented as an example of a vehicle of a sixth embodiment. Referring to FIG. 14, a hybrid vehicle 100C has substantially the same structure as hybrid vehicle 100 of the first embodiment shown in FIG. 1 except for that hybrid vehicle 100C includes a motor generator MGR, wheels 8 and an inverter 25, and also includes a power line ACL3 instead of power line ACL1.

Motor generator MGR is provided in hybrid vehicle 100C as a drive source for driving wheels 8 (which are, e.g., rear wheels when wheels 6 are front wheels). Motor generator MGR includes Y-connected three-phase coils, each of which has an end connected to ends of the other coils to form a neutral point N3. A power supply line ACL3 is provided between neutral point N3 and AC port 60.

Inverter 25 is provided corresponding to motor generator MGR, and is connected, in parallel with inverters 10 and 20, to positive and negative lines PL and NL. Inverter 25 has substantially the same structure as inverter 10.

In hybrid vehicle 100C, motor generators MG2 and MGR generating the drive powers for the wheels are larger than motor generator MG1 primarily used for electric power generation, and stray capacitances between vehicle ground 80 and motor generators MG2 and MGR are larger than that between vehicle ground 80 and motor generator MG1.

In hybrid vehicle 100C, the electric power is transmitted and received between the vehicle and load 90, using motor generators MG2 and MGR having relatively large stray capacitances among motor generators MG1, MG2 and MGR. Thus, power lines ACL2 and ACL3 are connected to neutral points N2 and N3 of motor generators MG2 and MGR, respectively, and the electric power is transmitted and received between the vehicle and load 90 via power lines ACL2 and ACL3.

When the electric power is transmitted and received between the vehicle and load 90, inverters 20 and 25 are controlled similarly to inverters 10 and 20 already described in connection with the first to third embodiments.

The electric power transmission and reception between the vehicle and load 90 is performed using motor generators MG2 and MGR having relatively large stray capacitances for the following reason. A common mode current of a high-frequency occurs according to high-frequency switching of the inverter, and the large stray capacitances of the motor generators can increase the quantity of the common mode current that returns to vehicle ground 80 via the stray capacitances of the motor generators without being output to load 90 via power lines ACL2 and ACL3 so that motor generators MG2 and MGR are used.

In other words, with increase in stray capacitances of the motor generators used for the electric power transmission and reception between the vehicle and load 90, the variation amount of the common mode voltage provided to load 90 via power lines ACL2 and ACL3 can be reduced to a higher extent. Accordingly, the sixth embodiment is configured to transmit and receive the electric power between the vehicle and load 90, using motor generators MG2 and MGR having relatively large stray capacitances among motor generators MG1, MG2 and MGR.

Accordingly, the sixth embodiment can effectively suppress the variation amount of the common mode voltage.

In the sixth embodiment, common mode choke coil 40 and/or Y-capacitor 50 may be arranged on power lines ACL2 and ACL3. These can reduce further effectively the variation amount of the common mode voltage.

In each embodiment already described, the hybrid vehicle is of a series/parallel type in which power splitting mechanism 4 can split the power of engine 2 for transmitting it to the axle and motor generator MG1. However, the invention may be applied to a so-called series type of hybrid vehicle in which engine 2 is used only for driving motor generator MG1, and only motor generator MG2 generates the vehicle drive power. Also, the invention may be applied to a motor-assist type of hybrid vehicle in which an engine operates as a main power source and an electric motor assists it when necessary.

The invention can be applied to an electric vehicle that does not have engine 2 and is driven only by an electric power, as well as a fuel-cell electric vehicle that includes a fuel cell as a power supply in addition to a power storage device. Thus, the invention can be generally applied to a system that has at least two AC motors each including Y-connected motor coils.

In each embodiment already described, a converter performing voltage conversion between power storage device B and inverters 10 and 20 may be arranged between power storage device B and inverters 10 and 20. This converter may be formed of, e.g., a known chopper circuit.

In the above description, load 90 corresponds to "an electric load outside a vehicle or a power supply outside the vehicle" in the invention, and motor generators MG1, MG2 and MGR correspond to "a plurality of AC electric rotating machines". ECU 30 and 30A correspond to "a control unit" in the invention, and capacitors C7 and C8 form "a line-bypass capacitor" in the invention. Further, relay 55 corresponds to "a shutdown device" in the invention.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An electric power control device capable of transmitting and receiving an electric power between a power storage device mounted on a vehicle and an electric load outside the vehicle or a power supply outside the vehicle, comprising:
    a plurality of alternating-current (AC) electric rotating machines each including star-connected multi-phase windings as stator windings;
    a plurality of inverters provided corresponding to said plurality of AC electric rotating machines;
    a plug connectable to said electric load or said power supply;
    a power line pair provided between said plug and neutral points of the multi-phase windings of the two AC electric rotating machines among said plurality of AC electric rotating machines; and
    a control unit configured to transmit and receive the electric power between said power storage device and said electric load or said power supply by controlling one of the inverters corresponding to said two AC electric rotating machines without using a pulse width modulation method and controlling the other inverter using said pulse width modulation method.

2. The electric power control device according to claim 1, wherein
    the electric power transmitted and received between said power storage device and said electric load or said power supply is an AC power having a frequency lower than a switching frequency of the said other inverter, and
    said control unit controls said one of the inverters to attain the conducting state by turning on one of upper and lower arms of said one of the inverters according to a supply direction of said AC power.

3. The electric power control device according to claim 2, wherein
    said control unit alternately switches between control using said pulse width modulation method and control of said conducting state for each of the inverters corresponding to said two AC electric rotating machines according to the supply direction of said AC power.

4. A vehicle comprising:
    a wheel receiving a drive torque from at least one of said plurality of AC electric rotating machines; and
    the electric power control device according to claim 3.

5. The electric power control device according to claim 2, wherein
    said control unit controls the said other inverter using said pulse width modulation method, and alternately turns on upper and lower arms of said one of the inverters according to the supply direction of said AC power.

6. A vehicle comprising:
    a wheel receiving a drive torque from at least one of said plurality of AC electric rotating machines; and
    the electric power control device according to claim 5.

7. A vehicle comprising:
    a wheel receiving a drive torque from at least one of said plurality of AC electric rotating machines; and
    the electric power control device according to claim 2.

8. The electric power control device according to claim 1, wherein
    when said power storage device is charged from said power supply, said control unit controls the said other inverter using said pulse width modulation method, and stops said one of the inverters.

9. A vehicle comprising:
    a wheel receiving a drive torque from at least one of said plurality of AC electric rotating machines; and
    the electric power control device according to claim 8.

10. The electric power control device according to claim 1, wherein
    a stray capacitance between each of said two AC electric rotating machines and a vehicle ground is larger than a stray capacitance between each of other AC electric rotating machine(s) and said vehicle ground.

11. A vehicle comprising:
    a wheel receiving a drive torque from at least one of said plurality of AC electric rotating machines; and
    the electric power control device according to claim 10.

12. The electric power control device according to claim 1, further comprising:
    a line bypass capacitor provided between said power line pair and a vehicle ground; and
    a shutdown device interrupting an electric circuit formed between said power line pair and said vehicle ground via said line bypass capacitor when said power storage device is charged from said power supply.

13. A vehicle comprising:
    a wheel receiving a drive torque from at least one of said plurality of AC electric rotating machines; and
    the electric power control device according to claim 12.

14. A vehicle comprising:
    a wheel receiving a drive torque from at least one of said plurality of AC electric rotating machines; and
    the electric power control device according to claim 1.

* * * * *

UNITED STATES PATENT AND TRADEMARK OFFICE
CERTIFICATE OF CORRECTION

PATENT NO.         : 8,054,013 B2                                    Page 1 of 1
APPLICATION NO.    : 12/312438
DATED              : November 8, 2011
INVENTOR(S)        : Hichirosai Oyobe et al.

It is certified that error appears in the above-identified patent and that said Letters Patent is hereby corrected as shown below:

On the title page, item (73) Assignee should read as follows:

--Toyota Jidosha Kabushiki Kaisha, Toyota (JP)
Nippon Soken, Inc., Nishio (JP)--

Signed and Sealed this
Twenty-fifth Day of June, 2013

Teresa Stanek Rea
*Acting Director of the United States Patent and Trademark Office*